United States Patent [19]
De Oliveira et al.

[11] Patent Number: 6,098,144
[45] Date of Patent: Aug. 1, 2000

[54] SOLID STATE DATA PROCESSOR WITH VERSATILE MULTISOURCE INTERRUPT ORGANIZATION

[75] Inventors: Jose A. W. D. De Oliveira, Sunnyvale, Calif.; Hendrik A. Klap, Nijmegen; Frederik Zandveld, Eindhoven, both of Netherlands

[73] Assignee: U.S. Philips Corporation, New York, N.Y.

[21] Appl. No.: 08/932,980

[22] Filed: Sep. 18, 1997

[30] Foreign Application Priority Data

Sep. 20, 1996 [EP] European Pat. Off. .............. 96202630

[51] Int. Cl.[7] ....................................................... G06F 9/48
[52] U.S. Cl. ............................................. 710/269; 710/50
[58] Field of Search ................................... 710/260, 266, 710/269, 48, 50

[56] References Cited

U.S. PATENT DOCUMENTS

| | | | |
|---|---|---|---|
| 5,481,725 | 1/1996 | Jayakumar et al. | 710/269 |
| 5,511,200 | 4/1996 | Jayakumar et al. | 710/269 |
| 5,659,760 | 8/1997 | Enami | 710/269 |
| 5,745,772 | 4/1998 | Klein | 710/269 |

FOREIGN PATENT DOCUMENTS

| | | | |
|---|---|---|---|
| 0355856 | 2/1990 | European Pat. Off. | G06F 13/24 |

*Primary Examiner*—Glenn A. Auve
*Attorney, Agent, or Firm*—Anne E. Barschall

[57] ABSTRACT

A data processor, includes a central processing unit, an interrupt handler for selectingly signalling a single interrupt vector to the central processing unit, and multiple interrupt sources that are daisy-chained to the interrupt handler, for therewith exchanging interrupt request signals and interrupt acknowledge signals. A Bus (or buses) interconnects all above subsystems. The interrupt handler communicates a read vector command to all interrupt sources in parallel and thereupon allows transmitting an actual interrupt address vector on the bus.

13 Claims, 6 Drawing Sheets

|  | Interrupt source | | | | | |
|---|---|---|---|---|---|---|
| INT_REQ[x] | A | B | C | D | E | F |
| 0 | x | x | x | | | |
| 1 | x | x | | | | |
| 2 | | | | x | | x |
| 3 | | | | x | x | x |
| INT_ACK[x] | A | B | C | D | E | F |
| 0 | x | x | | | | |
| 1 | x | x | | | | |
| 2 | | | | x | | x |
| 3 | | | | x | x | x |

SOLID STATE DATA PROCESSOR WITH VERSATILE MULTISOURCE INTERRUPT ORGANIZATION

BACKGROUND OF THE INVENTION

The invention relates to a data processor which has interrupt in a central processing unit, an interrupt handler which signals a single interrupt vector, and multiple interrupt sources connected to an interrupt handler through a daisy-chain unit to exchange interrupt request signals and interrupt acknowledge signals[]. The interrupt handler communicates a read vector command to all interrupt sources in parallel, to allow transmission of an actual interrupt address vector. In particular, the various interrupt sources may be distributed among a plurality of individual daisy chains.

Interrupt organizations have been around for a long time, but a need for further improvement and extension is still being felt. Such development may lie on various levels of quality and quantity, for which reason the present invention should in particular cater to:

- it should support a large number of different interrupt sources and/or interrupt causes, typically 200 or more;
- it should support a large number of different priority levels, typically 16 or 32;
- it should provide vector support to facilitate fast selection of an appropriate handler routine;
- it should be easily extendible in size;
- it should allow flexible allocation of interrupt priorities.
- it should require only a minimum of routing overhead.

No system has been encountered that is capable of meeting all above requirements at an acceptable price/performance level.

SUMMARY TO THE INVENTION

In consequence, amongst other things, it is an object of the present invention to provide a data processor with an interrupt architecture that offers a comprehensive and versatile solution to the combinations of all above requirements. Now thereto, according to a first aspect, the invention includes an interrupt handler unit which communicates a "read vector" command to all interrupt sources in parallel, for thereupon allowing transmitting an actual interrupt address vector on a bus. In particular, the bus may be used for other transport types outside the interrupt procedure; this lessens hardware requirements.

Advantageously, an interrupt default vector generator tails a daisy-chain unit. This feature avoids the development of blocked progress. Further advantageous aspects are recited in dependent Claims.

BRIEF DESCRIPTION OF THE DRAWING

These and other aspects and advantages of the invention will be described more in detail hereinafter with reference to the disclosure of preferred embodiments, and in particular with reference to the appended Figures that show.

DETAILED DESCRIPTION OF PREFERRED EMBODIMENTS

Figure 1:
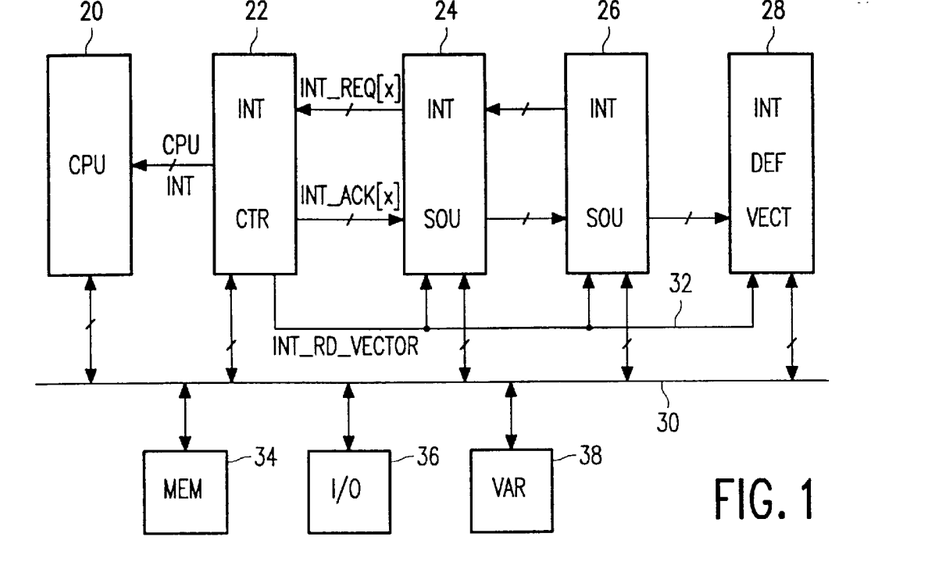
FIG. 1, an elementary embodiment of an interrupt architecture according to the invention.

FIG. 1 shows an elementary embodiment of an interrupt architecture according to the invention. The block diagram contains the principal subsystems of an integrated circuit VLSI data processor. As shown, central processor unit 20 is attached to PI bus 30, as are an interrupt controller 22, interrupt sources 24 and 26, and interrupt default vector generator 28. In practice, the number of interrupt sources may be large: an envisaged system may have >20 such physical sources which collectively may generate >200 different interrupt causes, that may be distinguished by an associated unique or non-unique interrupt vector. As will be shown in FIG. 4 hereinafter, the physical interrupt sources are effectively ORED for presenting an interrupt request signalization on one of the INTREQ lines to interrupt controller 22, and chained likewise in series for receiving an interrupt acknowledge signalization, one for each ORED line, on the lower multibit line from interrupt controller 22. The number of these lines may be greater than 1, and the interrupt handler may decide which request is to be handled first, e.g. as based on a hierarchy, on a round robin schedule. Controller 22 further presents to all such sources an Interrupt_Read_Vector signal on line 32. The interrupt vector proper can be presented to the central processing unit 20 by the actually partly self-selected active source on overall bus 30. Preferably, this is the so-called PI-bus as disclused in PCT Application EP 94/01711. Further, the processor has been shown with an on-chip or off-chip memory 34, I/O subsystem 36, and a "various" subsystem indicated as 38, such as a control unit BCU, not part of the invention. Interrupt-generating devices would be arranged in the string 24–26. Preferably, the architecture should allow low-level as well as sophisticated interrupt sources.

By way of non-limitative example, the processor may be a RISC-processor, and the number of ORED interrupt request lines may be equal to 16. Upon receiving an interrupt request, interrupt controller or handler 22 executes interrupt masking, and furthermore determines which one of possibly coexistent interrupts has highest priority. An appropriate one-bit signal indicates to central processing unit 20 the existence of a nonmasked interrupt. When central processing unit 20 requests to read the actual interrupt vector, the interrupt controller 22 generates an acknowledge signal on the particular line of the acknowledge bus, which corresponded to the ORED line which the source then choose, or even chooses at that instant. If an interrupt source accepts the actual acknowledge signal, it will generate the lower part of the interrupt vector, while the interrupt controller will generate the upper part. If under particular circumstances, the interrupt acknowledge signal is not accepted by any of the connected sources, but arrives at Interrupt Default Vector Generator 28, the latter will generate the lower part of the interrupt vector instead. Subsequently, the interrupt vector is applied to bus 30 for the central processing unit.

Definitions

CPU: the CPU is a processing unit on the IC. Interrupts are generated to interrupt the normal program flow to perform interrupt service routines.

CPU_INT[M−1 . . . 0]: this is the single CPU interrupt bus which consists of M lines, that connect the interrupt controller to the CPU.

Interrupt controller: decodes the interrupt request from the various interrupt sources into CPU interrupt requests, and selects one out of possibly many (16) ORED REQUESTs. It also acknowledges the interrupts and generates the upper part of the interrupt vector.

Interrupt default vector generator: generates the lower part of the interrupt vector if no interrupt source does it.

Interrupt source: every module on the IC that may want to interrupt the CPU. A particular module may generate various different interrupts, on one or more ORED Request lines.

INT_REQ[N−1 ... 0]: the N lines of the interrupt request bus connect the interrupt sources to the interrupt controller.

INT_ACK[N−1 ... 0]: the N lines of the interrupt acknowledge bus run from the interrupt controller via the interrupt sources to the interrupt default vector generator. Each line INT_ACK[x] correspond to an ORED interrupt request line INT_REQ[x].

INT_CLEAR: the interrupt status variable INT_STATUS located in the interrupt source can be cleared by writing a '1' to the corresponding interrupt clear variable INT_CLEAR.

INT_ENABLE: the interrupt enable variable INT_ENABLE located in the interrupt source can be set to '1' to admit an interrupt to the interrupt request lines or to '0' to ignore it.

INT_MASK: the (optional) interrupt masking variable to mask the different interrupt request lines INT_REQ[x].

INT_MASK_LEVEL: the (optional) interrupt masking level variable to mask all interrupt request lines INT_REQ[x] below a certain level.

INT_PRIORITY[N−1 ... 0]: the (optional) interrupt request line priority variables to facilitate varying the priority for each interrupt request line INT_REQ[x] separately.

INT_RD_VECTOR: this interrupt read vector line connects the interrupt controller to all interrupt sources. It is asserted by the interrupt controller when the CPU wants to read the interrupt vector INT_VECTOR: first comes signal ACK, and thereafter the RD_vector.

INT_SET: the optional interrupt status variable INT_STATUS located in the interrupt source can be set by writing a '1' to the corresponding interrupt set variable INT_CLEAR.

INT_STATUS: the interrupt status variable INT_STATUS located in the interrupt source equals '1' if the source wants to interrupt the CPU, or '0' if the interrupt source does not want to interrupt.

INT_VECTOR: the CPU will read the interrupt vector variable to branch to the appropriate interrupt routine when it is interrupted. The interrupt vector variable is split into two 16-bit parts:

INT_VECTOR[31..16]: the upper part of the interrupt vector variable is always generated by the interrupt controller;

INT_VECTOR[15..0]: the lower part of the interrupt vector can be generated by the various interrupt sources or by the interrupt default vector generator.

L: the number of bus clock cycles required for the daisy-chained interrupt acknowledge signal to run through all interrupt sources (and back to the interrupt controller).

M: the CPU dependent width of the CPU interrupt bus. Generally, M=1.

N: the width of the interrupt request bus. Typically N equals 16 or 32. Also, N is the number of INT_ACK lines.

PI-bus D: these lines are the data lines of the bus.

PI-bus CLK: this is the clock signal of the bus.

Variables in the Interrupt Sources and the Interrupt Controller

The variables are part of registers that can be read and written via the bus. The addresses of the registers are mapped within the bus address range, allocated to the particular interrupt source or the interrupt controller.

Each interrupt source has a number of variables. There is a set of variables (INT_STATUS, INT_ENABLE, INT_CLEAR and optionally INT_SET) for each interrupt it can generate, and usually another set of variables will control the further behaviour of the device containing the interrupt source. Also one or more INT_VECTOR[15..0] variables or constants can be part of an interrupt source.

The interrupt controller has a number of variables such as INT_VECTOR[31..16], and further variables for masking and priority decoding. The address of the total interrupt vector INT_VECTOR is mapped in the address range allocated to the interrupt controller.

The interrupt default vector generator may have a programmable default INT_VECTOR[15..0] variable. If so, the address thereof is mapped in the address range allocated to the interrupt default vector generator.

Requesting an Interrupt

When an interrupt source has an (internal) interrupt request, it writes a '1' to the corresponding INT_STATUS variable. If also the corresponding INT_ENABLE variable equals '1', the request is sent to the interrupt controller via the interrupt request line INT_REQ[x] this particular interrupt is connected to. If the INT_ENABLE variable equals '0', the internal request is ignored. It is only sent to the interrupt controller, when INT_ENABLE has been set to '1'.

Masking and Prioritising

The implementation of masking and prioritising are not specified. There is no explicit order among the N interrupt request lines INT_REQ[N−1 ... 0] and the M CPU interrupt lines CPU_INT[M−1 ... 0]. The priority decoder may be fixed in hardware or may be programmable. The masking feature is not a strict prerequisite.

The simplest implementation of the masking and prioritising is by a strict and fixed hierarchy. Another solution is to implement an N-bit interrupt mask register, each bit of the register masking one interrupt request line. When a bit of the interrupt mask register equals '1', the corresponding interrupt request line is enabled and when the bit equals '0', the corresponding interrupt request line is disabled. A third solution is to implement an interrupt mask level register. Only interrupt request lines with a rank at least equal to the value of the interrupt mask level register are enabled, the others are disabled. Prioritising can be done by implementing a priority variable for each interrupt request line, so that the priority for each interrupt request line INT_REQ[x] can be set separately. Combinations of the above are feasible as well. Other ways of deciding on the highest priority are often feasible, such as round robin.

Interfacing with the CPU

The way in which the N interrupt request lines INT_REQ[N−1 ... 0] are connected (after masking and prioritising) to the M CPU interrupt lines CPU_INT[M−1 ... 0] is implementation specific. Usually, M=1 is sufficient. When the CPU is interrupted, it may perform some specific actions such as context saving, and then it branches to an interrupt vector. In the end, the software branches to the interrupt handler, using the interrupt vector INT_VECTOR as an offset to a branch table base address: this is fast, because no further processing is necessary on various specific bits from the INT_VECTOR, the interrupt handler, or the actual source.

Generating the Acknowledge and Getting the Interrupt Vector

The interrupt vector INT_VECTOR is addressed as a bus register, mapped on the address area allocated to the interrupt controller. If the interrupt controller receives a bus read request for the interrupt vector, it will select an acknowledge signal associated to REQ and its priority mask; an active source will subsequently self-select according to the daisy chain, (or the interrupt default vector generator) and via one interrupt acknowledge line, and will request the interrupt source (or the interrupt default vector generator) to put the lower part of the interrupt vector (INT_VECTOR[15 ... 0]) on the PI-bus D-lines. The upper part INT_VECTOR[31 ... 16] is always generated by the interrupt controller itself.

The interrupt controller will latch the current value of the interrupt request lines, before or after masking and prioritising. Only the active interrupt request line with the current highest priority, depending on the masking and prioritising schemes, will be answered with a daisy-chained interrogation signal on its corresponding interrupt acknowledge line. Other interrupt request lines will remain unanswered for the moment. The daisy-chain starts running through the interrupt sources connected to the asserted interrupt acknowledge line.

If more than one interrupt source generated a request on the selected interrupt request line, the daisy-chain takes care that only one of the interrupt sources gets the acknowledge. This will be the interrupt source connected logically closest to the interrupt controller. Other sources located 'downstream' get blocked from the acknowledge. This leads to an implicit scheme of sub-priorities for each pair of interrupt request and acknowledge lines. The interrupt source wired closest to the interrupt controller has a higher sub-priority within the daisy-chain.

Some delay is introduced to give the acknowledge signal enough time to run through the daisy-chain. During this delay the interrupt controller will drive the bus acknowledge ACK-lines with the WAT-acknowledge. The delay is equal to L bus clock cycles, synchronous to the rising edge of the bus clock CLK. The exact number of bus wait cycles is governed by the delay in the daisy-chained interrupt acknowledge lines and depends on the implementation.

After this delay, the interrupt controller will assert the interrupt read vector signal INT_RD_VECTOR during the last WAT-acknowledge (because the INT_RD_VECTOR signal is an early signal) and drive the bus ACK-lines with the RDY-acknowledge instead of with the WAT-acknowledge. In this cycle, the interrupt controller will also put bits 31 to 16 of the interrupt vector INT_VECTOR[31 ... 16] on the bus while bits 15 to 0 of IN_VECTOR[15 ... 0] will be driven by either the acknowledged interrupt source or by the interrupt default vector generator.

The interrupt controller quasi "freezes" acknowledgement of new interrupts during the reading of the vector to avoid possible race conditions. The upper part of the interrupt vector, INT_VECTOR[31 ... 16], may contain the priority signalization, and is always generated by the interrupt controller. There are many different lower parts of the interrupt vector INT_VECTOR[15 ... 0], from at least one (in the interrupt default vector generator) to as many as one for each interrupt.

Clearing the Interrupt Request

When the interrupt request has been serviced by an interrupt routine, the interrupt source can be cleared by writing a '1' to the corresponding INT_CLEAR variable. It is not recommended to clear the INT_STATUS variable by writing a '0' to it, since a read-modify-write action might interfere with the hardware changing other bits in the same register.

Figure 2:
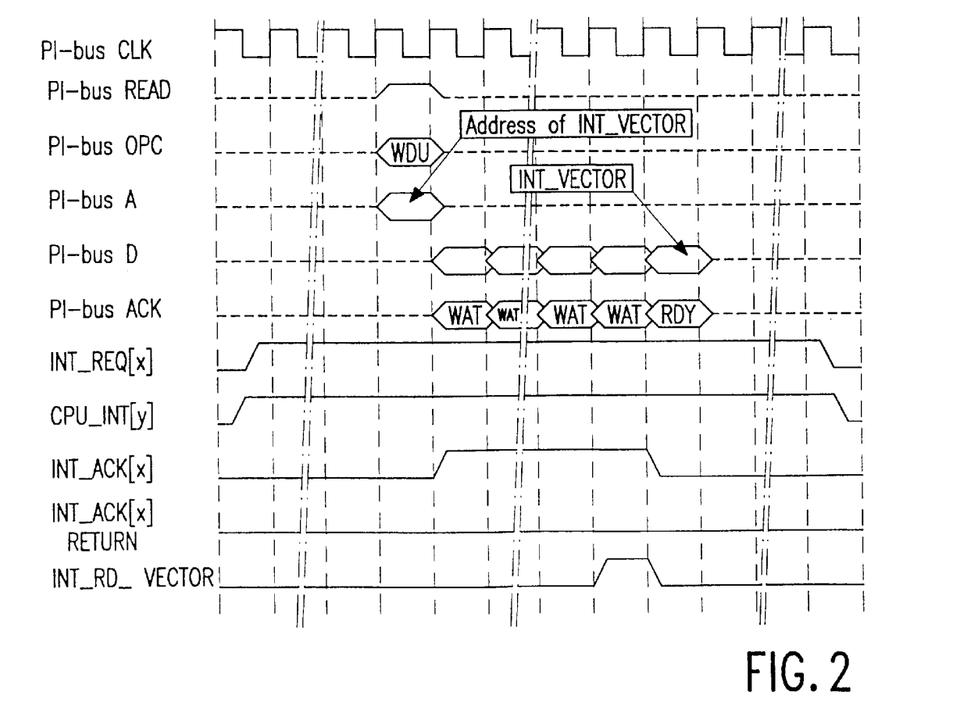
FIG. 2, a timing diagram of the interrupt mechanism.

FIG. 2 is a diagram of the full timing mechanism of the architecture. The signal INT_REQ[x] is asynchronous, the signal INT_RD_VECTOR is synchronous with the bus CLK. The successive traces show the following signals: the system bus clock, the bus read operation, the bus Operation code, the bus Address signalization, in particular the address contained in the interrupt vector, the bus Data slots, of which the final one transmits the Interrupt vector, the bus acknowledge, that has four wait cycles, followed by a single acknowledge cycle, the interrupt request signalization, the CPU interrupt signalization, the interrupt acknowledge, the interrupt acknowledge return (no signalization), and finally, the interrupt read vector. The vertical wave lines denote intervals of appropriate size.

Signals

INT_REQ[N−1 ... 0] connect the interrupt sources to the interrupt controller. No order or priority is specified. Interrupt sources are hooked up to these lines by means of OR-gates. Each interrupt source can connect to one or more interrupt request lines. The interrupt request lines are asynchronous and active high.

INT_ACK[N−1 ... 0]: each interrupt acknowledge line INT_ACK[x] corresponds to one interrupt request line INT_REQ[x]. The interrupt acknowledge lines are asynchronous and active high.

When the CPU addresses the interrupt controller to read INT_VECTOR, the controller activates exactly one of the interrupt acknowledge lines. Priority and masking schemes determine which acknowledge line will be activated. The interrupt acknowledge lines are daisy-chained through the interrupt sources that correspond with REQ. Any source can block the acknowledge signal for other interrupt sources 'downstream' when it has an interrupt pending on the corresponding request line.

INT_RD_VECTOR: the interrupt read vector line connects the interrupt controller to the interrupt sources that are capable to generate the lower half of the interrupt vector, including the interrupt default vector generator. When the CPU addresses the interrupt controller to read INT_VECTOR, it is asserted by the interrupt controller after a delay of L−1 bus clock cycles. The interrupt read vector line is active high and synchronous to the bus clock CLK.

CPU_INT[M−1 ... 0]: these M are the CPU interrupt lines, usually M=1, for connecting the interrupt controller to the CPU. When the interrupt controller receives one or more interrupt requests on the interrupt request lines INT_REQ [N−1 ... 0], it asserts one or more of the CPU interrupt lines (if not all REQs are masked). Which line(s) will be asserted depends on the masking and priority schemes and on the mapping to the CPU interrupt lines, which are all implementation specific. The active level and timing behaviour of the CPU interrupt lines are CPU dependent.

PI-bus D: these lines are the PI-bus data lines.
PI-bus CLK: this is the clock signal of the PI-bus.
ACK=WAT (wait), ACK=RDY (ready), depending on actual situation.

Figure 3:
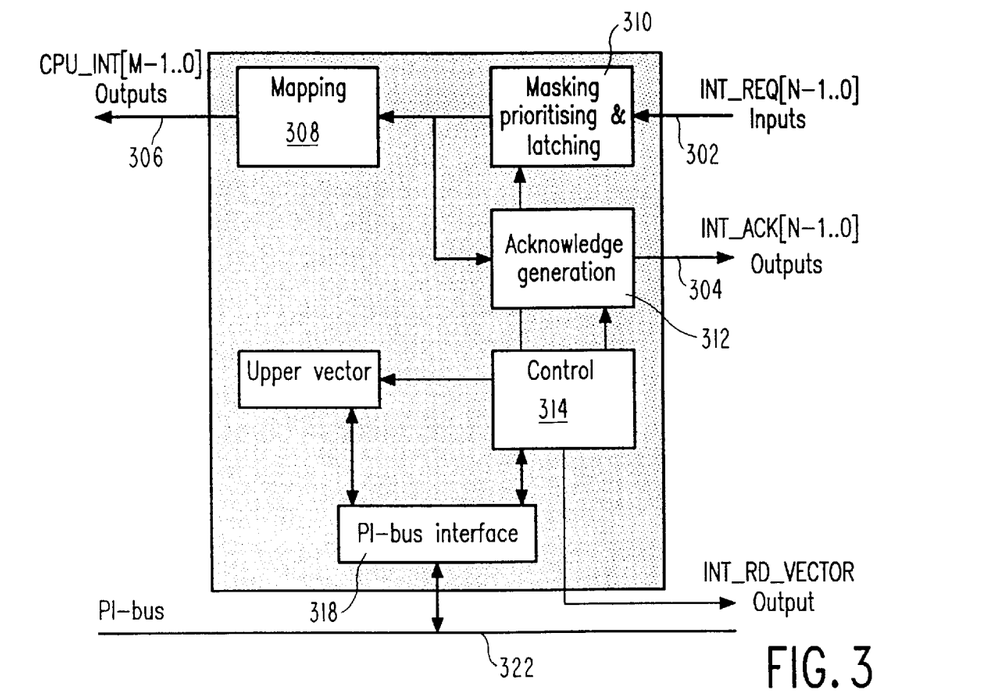
FIG. 3, a block diagram of the interrupt controller.

FIG. 3 is a block diagram of the interrupt controller. At the top right corner, the N interrupt request lines 302 arrive. After passing through the masking, prioritising and latching block 310, the N lines are mapped 308 to the M usually single (M=1) CPU interrupt lines 306.

A bus read request for the interrupt vector is routed via the bus interface 318 to control block 314. This block controls the latching block 310, and the acknowledge generation block 312, which generates the proper daisy-chained interrupt acknowledge on line 304.

After a delay of L−1 bus clock-cycles, the control block requests the upper vector block to put the interrupt vector INT_VECTOR[31 . . . 16] data on the bus 322 D-lines in the next bus CLK cycle. At the same time, the control block 314 asserts the INT_RD_VECTOR line to request the lower vector block (in one of the interrupt sources or in the interrupt default vector generator) to put the INT_VECTOR [15 . . . 0] data on the bus D-lines in the next PI-bus CLK cycle. In the interrupt controller, only the INT_VECTOR variable is mandatory.

INT_VECTOR: this interrupt vector variable is read by the CPU by issuing a PI bus read request. The INT_VECTOR variable is split into two parts. The upper 16 bits INT_VECTOR[31 . . . 16] are always generated by the interrupt controller. The lower 16 bits INT_VECTOR[15 . . . 0] are generated by either the acknowledged interrupt source or by the interrupt default vector generator.

The interrupt vector variables INT_VECTOR[31 . . . 16] in the interrupt controller can be fixed constants (read-only) or programmable (also writable). A different INT_VECTOR[31:16] variable or constant may be selected according to decisions made by the masking or priority mechanism. The priority may be part of INT_VECTOR [31:16].

INT_MASK: an optional interrupt masking variable to mask the various interrupt request lines INT_REQ[x]. Each bit INT_MASK[x]=0 in this variable will mask the corresponding interrupt request line INT_REQ[x].

INT_MASK_LEVEL: if an optional interrupt masking level variable is used to mask all interrupt request lines INT_REQ[x] below a certain level, it is called INT_MASK_LEVEL. If this variable has a value of y, all interrupt request lines INT_REQ[x] with x<y will be masked (if y=0, no interrupt request lines whatsoever will be masked).

INT_PRIORITY[N−1 . . . 0]: if the optional interrupt request line priority variables are implemented, these are called INT_PRIORITY[N−1 . . . 0]. These variables typically have a width of four bits (for N=16) and facilitate setting the priority for each interrupt request line INT_REQ [x] separately.

Figure 4:
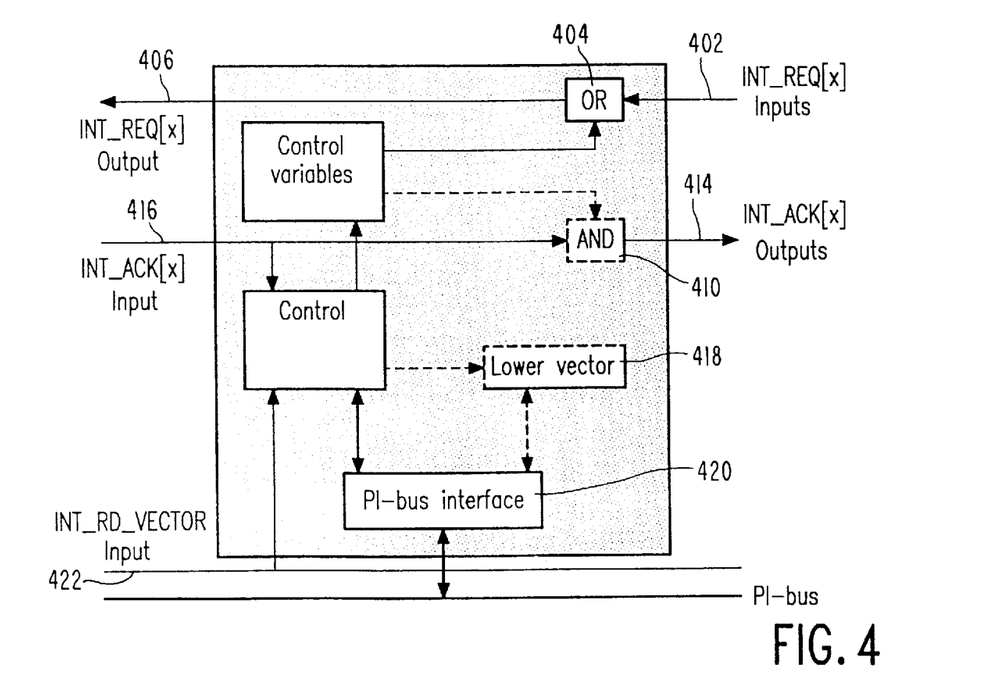
FIG. 4, a block diagram of an interrupt source.

FIG. 4 is a simple block diagram of an interrupt source. At the top right and left corners, the interrupt request line comes 402 in and goes out 406. If the incoming interrupt request line is active, the outgoing interrupt request line will also be active. If the incoming interrupt request line is not active, the outgoing interrupt request line may be active if the interrupt source has an (enabled) interrupt request available via OR 404.

In the middle at the left and right sides of the interrupt source, the interrupt acknowledge line comes in 416 and goes out 414. The outgoing interrupt acknowledge line will only be active if the incoming interrupt acknowledge line is active and the interrupt source does not have an enabled interrupt request pending through AND 410. This AND is optional and need not be implemented if the interrupt source will not generate its own INT_VECTOR[15 . . . 0] but makes use of the default vector INT_VECTOR[15 . . . 0] generated by the interrupt controller.

At the bottom of the picture, the bus interface 420 and the read vector line INT_RD_VECTOR input 422 are drawn. When the INT_RD_VECTOR line input is active, and the interrupt source does have an acknowledged interrupt request pending, the lower part of the interrupt vector INT_VECTOR[15 . . . 0] will be put on the bus D-lines in the next bus cycle. The INT_RD_VECTOR line also is not implemented if the source does not generate its own INT_VECTOR[15 . . . 0].

Each interrupt source will have three (and an optional fourth) 1-bit variables for each interrupt it can generate. It also has an optional INT_VECTOR[15 . . . 0] variable.

1 INT_STATUS: this variable equals '1' if the source wants to interrupt the CPU, or '0' if the interrupt source does not want to interrupt. This variable can be a separate register, a flip-flop, or it can be represented by a state in a (finite) state machine. The variable may be read by means of the bus for polling. Other variables in the same register can be changed by the hardware in the meantime. Clearing and setting the variable can be done via the INT_CLEAR (and optional INT_SET, such as for diagnostic purposes) variable. The address of the variable is mapped within the bus address range, allocated to the particular interrupt source.

2 INT_ENABLE: this variable can be set to '1' to admit the variable INT_STATUS to the interrupt request lines (via the OR-gate) or to '0' to ignore the INT_STATUS variable and to disconnect it from the interrupt request lines. INT_ENABLE can be read and written via the PI-bus. The address of the variable is mapped within the PI-bus address range, allocated to the particular interrupt source.

3 INT_CLEAR: INT_STATUS[b] can be cleared by writing a '1' to the corresponding INT_CLEAR variable. Writing a '0' to this variable will be ignored. After writing a '1' to this variable, the variable will be reset to '0' automatically. The address of the variable is mapped within the bus address range, allocated to the particular interrupt source.

4 INT_SET: this optional variable can be set to '1' by writing a '1' to the corresponding INT_SET variable to be able to simulate an interrupt of this particular source. Writing a '0' to this variable will be ignored. After writing a '1' to this variable, the variable will be reset to '0' automatically. This variable is optional. The address of the variable is mapped within the PI-bus address range that is allocated to the particular interrupt source.

INT_VECTOR[15 . . . 0]: the lower 16 bits of the interrupt vector variable INT_VECTOR are generated by the interrupt source 418. It does so after it receives a request on the read vector line INT_RD_VECTOR 422 and the particular interrupt has been acknowledged. The INT_VECTOR[15 . . . 0] variable can be a fixed constant or a programmable register. If a fixed constant, its value is hard-wired. If a programmable register, the address is mapped in the PI-bus address range allocated to the interrupt source (a programmable INT_VECTOR[15 . . . 0] variable in an interrupt source may be read via its local INT_VECTOR[15 . . . 0] address located in the interrupt source). Generally, the two least significant bits should always be zero to allow its usage as a 32-bit address word, used as offset in a table. This variable is optional; by default the interrupt default source will generate the lower 16 bits of INT_VECTOR. For brevity, detailed mapping of the above variables and other items within the interrupt source, have not been specified here. A separate PI-bus address may be formed by adding or combining in one or more addressable registers.

Figure 5:
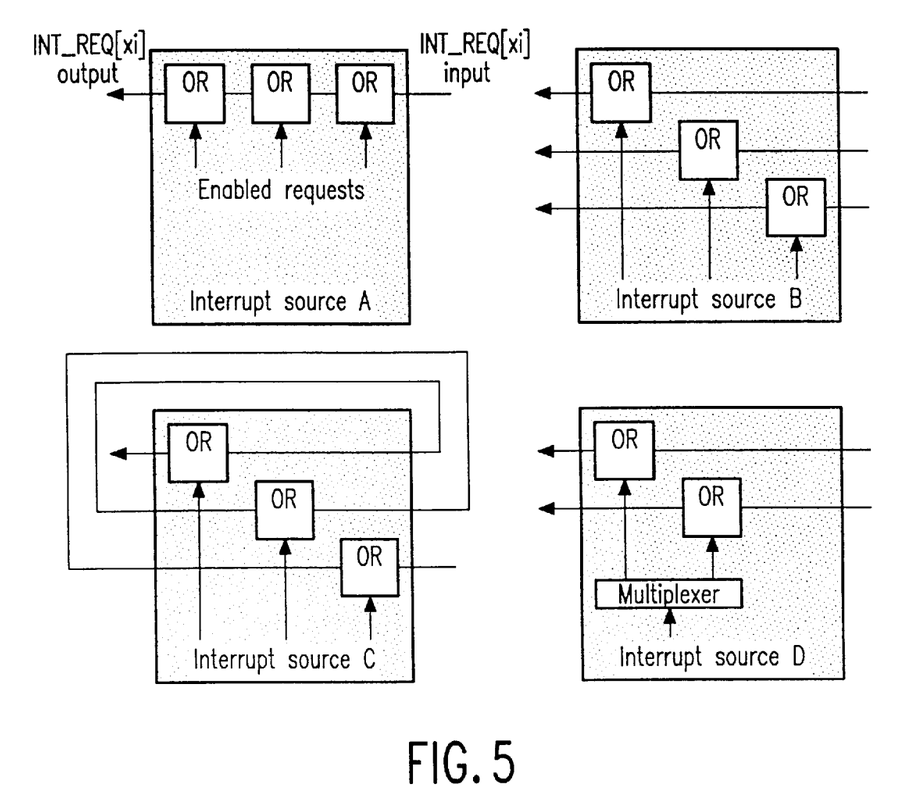
FIGS. 5A–5D, four different interrupt source implementations.

For any interrupt source, all interrupts may either be connected to the same interrupt request line INT_REQ[x] or connected to different interrupt request lines. See FIGS. 5A and 5B, that through OR-gates illustrate various implementations. Approach B is more flexible. The various interrupt requests can be chained on one interrupt request line if desired, FIG. 5C. It is allowed to make the interrupt request line programmable, if the correct mapping to the interrupt acknowledge lines is multiplexed, FIG. 5D.

Simple interrupt sources can be clustered and combined into one larger interrupt source to reduce cost on the bus interface, the request and acknowledge mechanisms and the INT_VECTOR[15 . . . 0] variable. Any interrupt source should have at least one line, but no more than the interrupt handler can handle. For each interrupt request line INT_REQ[x], one interrupt acknowledge line INT_ACK[x] may or may not be implemented.

Figure 6:
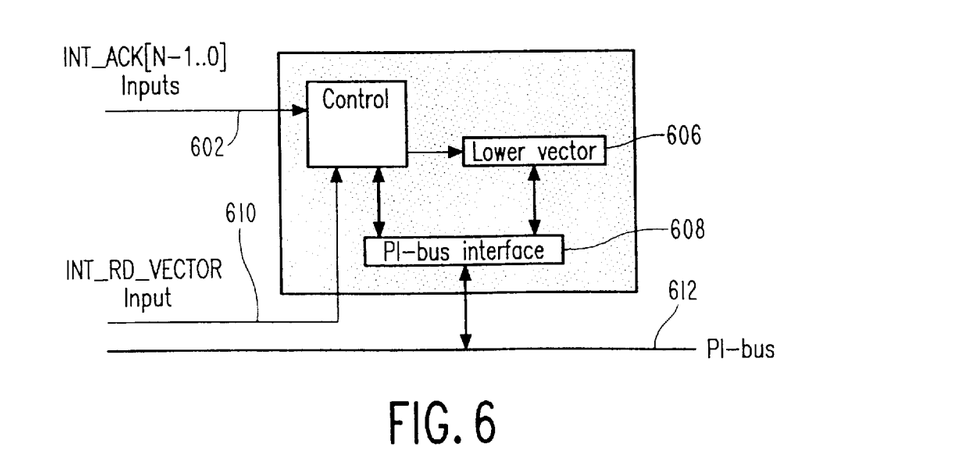
FIG. 6, a block diagram of an interrupt default vector generator.

FIG. 6 is a block diagram of the interrupt default vector generator. At the left side, the interrupt acknowledge lines INT_ACK[N-1 . . . 0] 602 come in. At the bottom of the picture, the PI-bus interface 608 and the read vector line INT_RD_VECTOR input 610 are drawn. When the INT_RD_VECTOR line input and an INT_ACK[x] are active, the lower part of the interrupt vector INT_VECTOR[15 . . . 0] 606 will be put on the PI-bus D-lines in the next PI-bus 612 cycle by the interrupt default vector generator.

INT_VECTOR[15 . . . 0]: these are the lower 16 bits of the (default) interrupt vector variable INT_VECTOR that are generated by the interrupt default vector generator. It does so after it receives a request on the read vector line INT_RD_VECTOR and an INT_ACK[x] is active. All details are the same as for the INT_VECTOR[15 . . . 0] variable inside the interrupt sources.

An array of N different INT_VECTOR[15 . . . 0] variables may be implemented, e.g. one for each incoming INT_ACK[x] line, so that a different interrupt vector can be generated for each priority level. The interrupt default vector generator can be clustered with the interrupt controller, such as to reduce cost.

The only requirements for the CPU are that it has enough interrupt inputs to connect to the CPU interrupt lines CPU_INT[M-1 . . . 0] and that it can issue a bus read request to read the interrupt vector INT_VECTOR. This read request may be issued directly by the CPU hardware or via an interrupt routine in software.

Interconnection

There are a number of requirements to the interconnection scheme for the CPU, the interrupt controller and the various interrupt sources.

Interrupt request lines INT_REQ[x] may not be split. They are all point-to-point connections between either:
- the INT_REQ[x] output and the INT_REQ[x] input of two different interrupt sources
- the INT_REQ[x] output and another INT_REQ[x] input of the same interrupt source, see FIG. 5
- the INT_REQ[x] output of an interrupt source and the INT_REQ[x] input of the interrupt controller.

When for an interrupt source, an interrupt request line INT_REQ[x] input is connected, the INT_REQ[x] out put must also be connected.

The INT_REQ[x] input of the first interrupt source in a chain will be connected to a logical '0' level.

Interrupt acknowledge lines INT_ACK[x] may not be split. They are all point-to-point connections between either:
- the INT_ACK[x] output and the INT_ACK[x] input of two different interrupt sources;
- the INT_ACK[x] output and another INT_ACK[x] input of the same interrupt source;
- the INT_ACK[x] output of the interrupt controller and the INT_ACK[x] input of an interrupt source;
- the INT_ACK[x] output of an interrupt source and the INT_ACK[x] input of the interrupt default vector generator;
- the INT_ACK[x] output of the interrupt controller and the INT_ACK[x] input of the interrupt default vector generator.

When for an interrupt source, an interrupt acknowledge line INT_ACK[x] output is connected, the INT_ACK[x] input and output also have to be connected. The INT_ACK[x] output of the last interrupt source in a chain will be routed to the corresponding INT_ACK[x] input of the interrupt default vector generator.

Every interrupt source is connected to at least one interrupt request line INT_REQ[x] and at most all interrupt request lines.

For each INT_REQ[x] line, there must be a corresponding INT_ACK[x] line. Even if no interrupt sources are connected to this INT_ACK[x] line, it must be routed to the interrupt default vector generator to enable the generation of the default INT_VECTOR[15 . . . 0] by the interrupt default vector generator. The interrupt default vector generator must be connected to all INT_ACK[N-1 . . . 0] lines.

Every interrupt source can be connected to from one to all interrupt acknowledge lines INT_ACK[x]. Interrupt sources that will not generate INT_VECTOR[15 . . . 0] do not have to be connected to the interrupt acknowledge lines INT_ACK[x].

Interrupt sources that will generate INT_VECTOR[15 . . . 0] have to be connected to the interrupt read vector line INT_RD_VECTOR. Interrupt sources that will not generate INT_VECTOR[15 . . . 0] do not have to be connected to the interrupt read vector line INT_RD_VECTOR. Also the interrupt default vector generator has to be connected to the INT_RD_VECTOR line.

The interrupt controller, all interrupt sources and the interrupt default vector generator must be connected to the PI-bus.

The CPU interrupt lines CPU_INT[M-1 . . . 0] are connected by the CPU interrupt line outputs of the interrupt controller to the interrupt inputs of the CPU.

Figure 7:
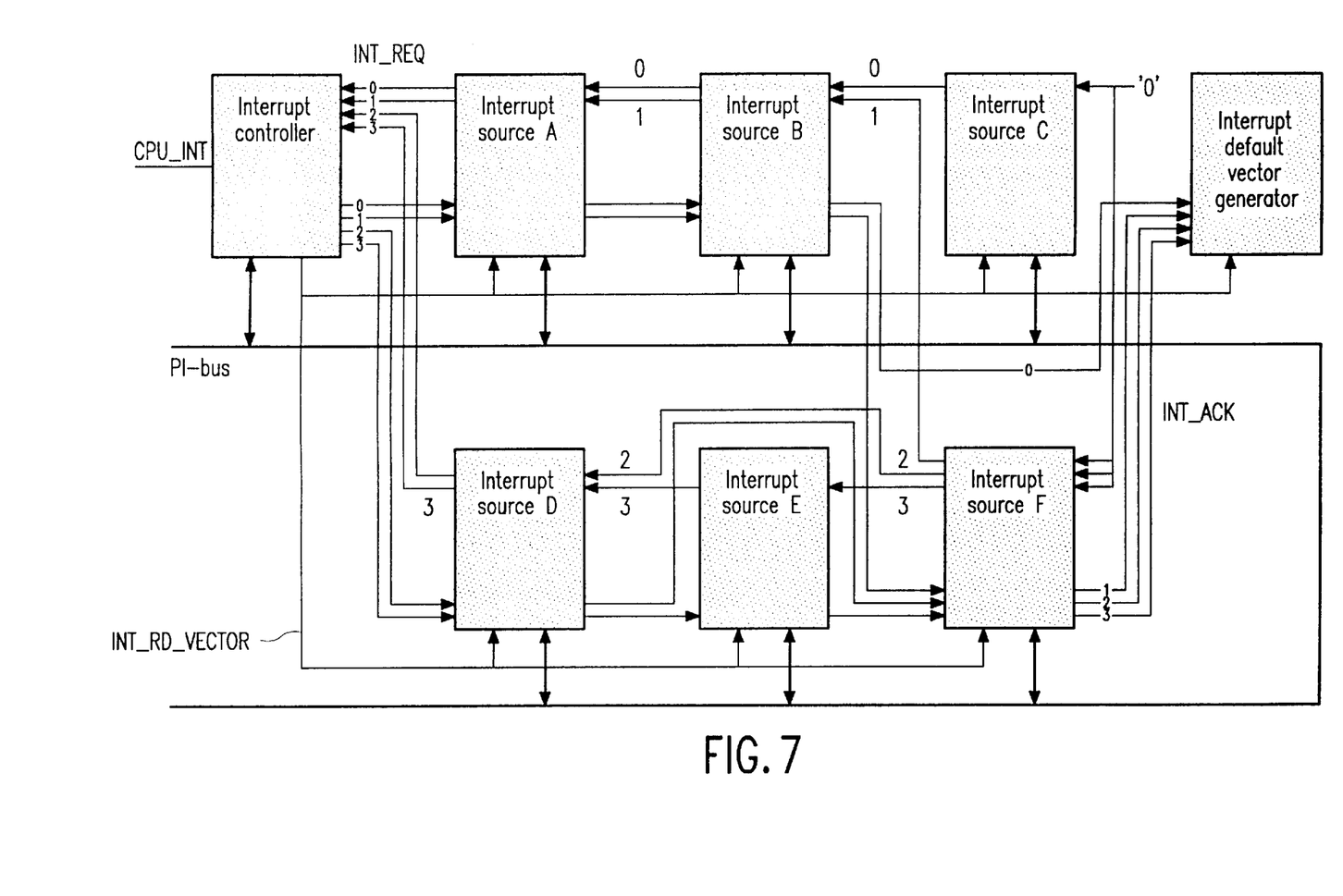
FIG. 7, a detailed example of an interconnection scheme.

FIG. 7 is a feasible interconnection scheme. Here, N=4 and M=1. There are four interrupt request lines INT_REQ[3 . . . 0] and also four interrupt acknowledge lines INT_ACK[3 . . . 0].

Figure 8:
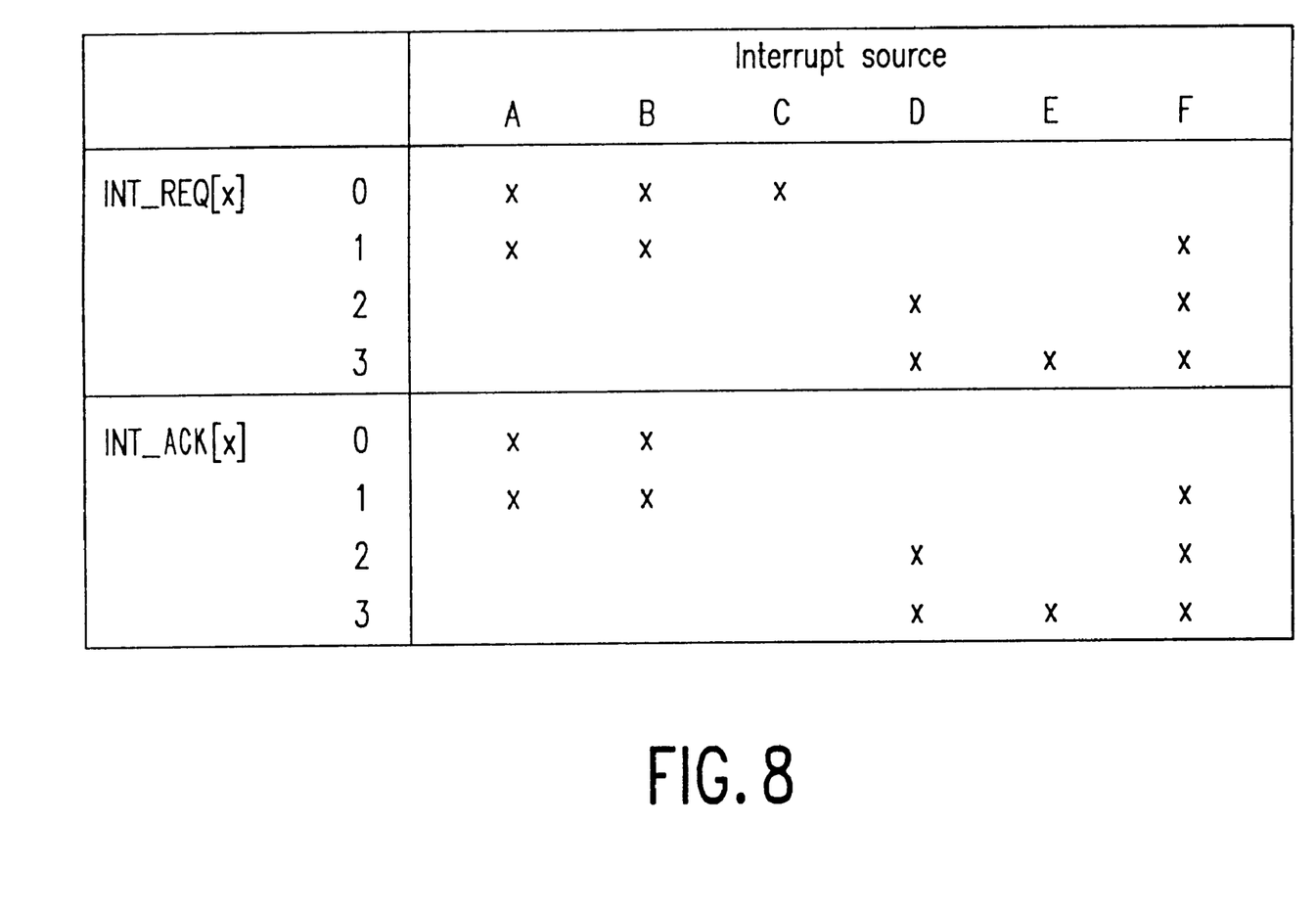
FIG. 8, an exemplary interconnection scheme.

The way in which various interrupt sources may be interconnected is listed in FIG. 8. Further, all interrupt sources, the interrupt controller and the interrupt default vector generator are connected to the interrupt read vector line INT_RD_VECTOR and the PI-bus. The CPU has not been shown, but the CPU interrupt bus consists of only one line CPU_INT. Note that source C in this case is not connected to INT_ACK[x], but obviously relies on the effective generation of the default vector.

Figure 9:
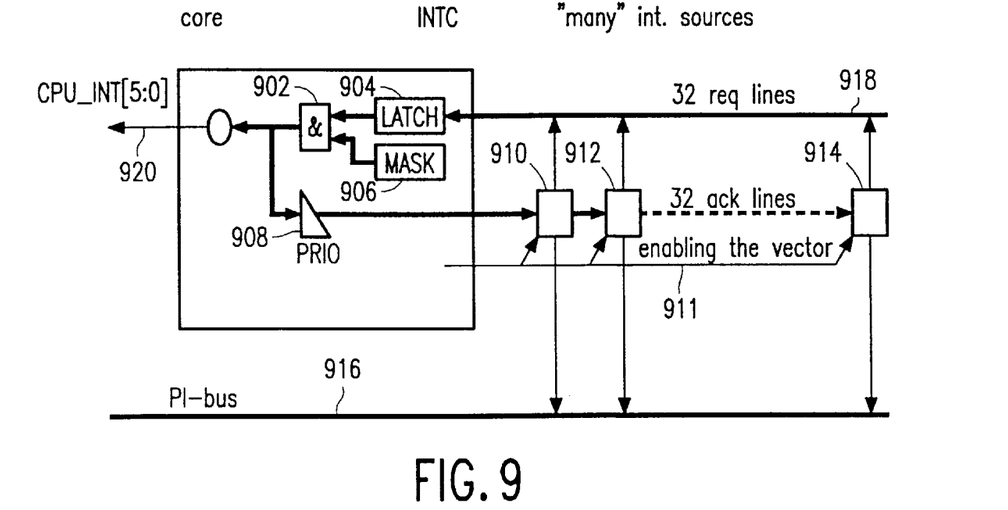
FIG. 9, an overview of the interrupt architecture.

FIG. 9 summarizes of the interrupt architecture, in particular, the operation of the interrupt controller core INTC, viz à viz the many possible sources of interrupt. Entering at right are 32 request lines 918, each representing a priority level. The information on these can be latched in latch 904. Mask register 906, bitwise ANDED in AND 902, forwards to priority determining element 908 and coder 903. The coder codes to six bit signal CPU_INT[5:0] on line 920, although one may be enough. The priority determined, acknowledges on 32 acknowledge lines 909, that are stringed through respective sources 910, 912, . . . 914, that collectively get a further control signal 911 from the core. As shown, the sources send signals to the request line channel, as well as to the system bus 916. The processor, when receiving the six-bit interrupt code,will, regardless the interrupt source, self-reliantly set the handling instant. It then will save status, and branch to an interrupt routine.

Then the processor will issue a bus read for the interrupt vector: this is an address, and the interrupt controller will latch the currently highest interrupt level and generate a daisy-chain interrogate to the sources connected to that level. The interrupt source, after the daisy-chain delay, will put its vector on the bus. Then the controller puts an ACK=OK on the bus ACK lines. The processor can now use the value actually received as an address offset to determine on further actions. In this manner a two dimensional array wise interrupt is realized, wherein both the physical interrupt sources and also their respectively generated interrupts may have independent values.

In the source, there are various variables: INT_X signals that an interrupt is present (1) or not; this may be a flipflop. The flipflop is reset by writing to a PI-bus mapped address in the PI-bus range allocated to the unit of which this interrupt source is a part. further, ENAB_X signals (1) to admit INT_X on the appropriate INT_REQ(L) line; this may be another flipflop, that can be read and written via the bus. Its address is in the bus range located to the unit of which this source is a part.

Figure 10:
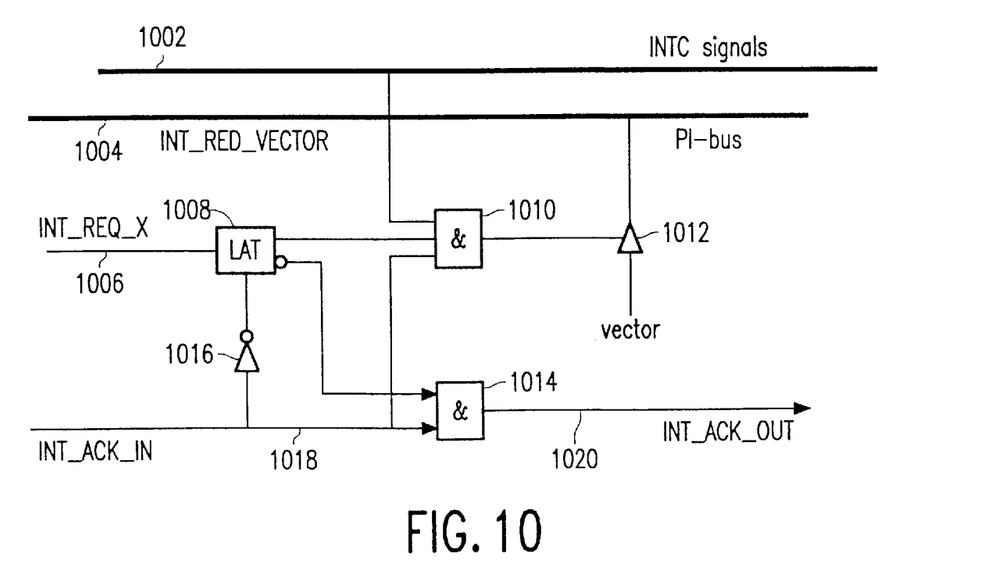
FIG. 10, the interrupt acknowledge daisy-chain and vector selection mechanism.

FIG. 10 shows an examplary interrupt acknowledge daisy-chain and vector selection mechanism for one particular interrupt source. At the top are the interrupt controller core bundle 1002 (=909) and the system bus 1004 (=916). From left arrive the bit INT_REQ_X and the interrupt acknowledge INT_ACK_IN. The latter is inverted in element 1016 for activating latch 1008, thereby latching INT_REQ_X. If a '0' is stored, the inverted latch output opens AND gate 1014, thereby allowing INT_ACK_OUT to travel further to the right. If a '1' is stored, AND 1014 is blocked, but AND 1010 is opened, subject to receiving a further '1' from the interrupt controller core, thereby activating buffer 1012. This then puts the interrupt vector on the bus.

What is claimed is:

1. A data processor comprising:
    a. a central processing unit;
    b. an interrupt handler;
    c. multiple interrupt sources;
    d. at least one daisy chain for coupling the multiple interrupt sources to the interrupt handler, for enabling the multiple interrupt sources and the interrupt handler to exchange interrupt request and acknowledge signals; and
    e. a bus coupling the central processing unit, the interrupt handler, and the multiple interrupt sources,
   wherein,
    the interrupt handler is adapted to communicate a read vector command to all the multiple interrupt sources via the at least one daisy chain;
    at least one of the multiple interrupt sources is adapted to supply at least a respective portion of an interrupt address vector to the interrupt handler, in response to the read vector command;
    the interrupt handler is further adapted to selectively communicate the interrupt address vector to the CPU, including at least the respective portion of the interrupt address vector.

2. A data processor as claimed in claim 1, wherein said at least one daisy chain comprises a plurality of individual chains; and
    said data processor is further adapted to allow prioritizing among such individual daisy chains.

3. A data processor as claimed in claim 1, further comprising an interrupt default vector generator at a tail of said at least one daisy chain.

4. A data processor as claimed in claim 1, wherein said bus means allow other transport types outside an interrupt procedure.

5. A data processor as claimed in claim 1, the interrupt address vector has an upper part that is communicated to the interrupt handler, and a lower part via the at least one daisy chain.

6. A data processor as claimed in claim 1, wherein the interrupt handler means comprise interrupt deciding means for deciding among a plurality of interrupt level signalizations received coexistently, to forward a single interrupt signalization to the central processing unit.

7. A data processor as claimed in claim 1, and allowing at least 200 different interrupt sources and/or interrupt causes.

8. A data processor as claimed in claim 1, supporting a number of different priority levels that is equal to to 16 or 32.

9. A data processor as claimed in claim 1 and allowing flexible allocation of interrupt priorities amongst of a plurality of interrupt sources and/or interrupt causes.

10. The data processor of claim 1 wherein
    said at least one daisy chain comprises a plurality of individual chains,
    an active one of the multiple sources is adapted to self select via a respective one of the individual daisy chains by communicating an acknowledge signal thereon; and
    the active one is further adapted to transmit at least the respective portion via the bus to the interrupt handler.

11. The data processor of claim 1, wherein
    the at least one of the multiple interrupt sources is adapted to supply a respective first portion of the interrupt address to the interrupt handler; and
    the interrupt handler is adapted to supply a respective second portion of the interrupt address and to assemble the interrupt address for the central processor.

12. The data processor of claim 1, wherein
    the data processor further comprises interrupt signalization means; and
    the at least one daisy chain comprises a plurality of separate daisy chains, disposed within the interrupt signalization means, arranged in parallel;
    the interrupt signalization means allows separate priority determination with respect to the various daisy chains in parallel.

13. The data processor of claim 12, further comprising sequencing means for
    in a first sequencing interval, selecting among a plurality of interrupt requests, via said interrupt handler; and
    in a second sequencing interval, for each of the separate daisy chains, selecting in a distributed manner amongst those interrupt requests originating from that chain.

* * * * *